(12) United States Patent
Ikeda et al.

(10) Patent No.: US 8,988,160 B2
(45) Date of Patent: Mar. 24, 2015

(54) DATA TRANSMISSION SYSTEM AND SEMICONDUCTOR CIRCUIT

(75) Inventors: Yasuhiro Ikeda, Fujisawa (JP); Yutaka Uematsu, Kawasaki (JP); Satoshi Muraoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1109 days.

(21) Appl. No.: 13/004,609

(22) Filed: Jan. 11, 2011

(65) Prior Publication Data

US 2012/0112849 A1 May 10, 2012

(30) Foreign Application Priority Data

Nov. 8, 2010 (JP) ................................. 2010-249998

(51) Int. Cl.
*H03H 2/00* (2006.01)
*H03H 7/38* (2006.01)
*H04B 3/02* (2006.01)

(52) U.S. Cl.
CPC ...................................... *H04B 3/02* (2013.01)
USPC ........................................... 333/32; 333/24 R (58) Field of Classification Search
USPC ................................................. 333/32, 24 R
See application file for complete search history.

(56) References Cited

U.S. PATENT DOCUMENTS

| | | | |
|---|---|---|---|
| 5,955,889 | A | 9/1999 | Taguchi et al. |
| 2003/0048616 | A1 | 3/2003 | Ko et al. |
| 2008/0310521 | A1 | 12/2008 | Otsuka et al. |
| 2009/0060023 | A1* | 3/2009 | Yamamoto et al. ............ 375/239 |

FOREIGN PATENT DOCUMENTS

| | | |
|---|---|---|
| JP | 05-226041 | 9/1993 |
| JP | 05-275574 | 10/1993 |
| JP | 06-282518 | 10/1994 |
| JP | 07-321828 | 12/1995 |
| JP | 08-316813 | 11/1996 |
| JP | 11-041042 | 2/1999 |
| JP | 2003-142646 A | 5/2003 |
| JP | 2008-294837 | 12/2008 |

OTHER PUBLICATIONS

Machine Translation of JP 2003-142646, translated Sep. 11, 2014.*
Machine translation of JP1994-282518, translated Sep. 11, 2014.*

* cited by examiner

*Primary Examiner* — Stephen E Jones
*Assistant Examiner* — Scott S Outten
(74) *Attorney, Agent, or Firm* — Foley & Lardner LLP (57) ABSTRACT

A data transmission system is provided in which it is possible to perform both of suppressing the degrading of the slew rate and suppressing the ringing even if load capacitance of an input buffer is changed.

The data transmission system transmitting data from an output buffer to the input buffer through a trace is provided with first RC parallel circuits connected in series to the trace on a first Printed Circuit Board (PCB) on which the output buffer is mounted, and second RC parallel circuits connected in series to the trace on a second Printed Circuit Board (PCB) on which the input buffer is mounted, and which can be connected and separated to and from the first Printed Circuit Board (PCB).

6 Claims, 6 Drawing Sheets

(a) When load capacitance is maximum, only first RC parallel circuits are applied (c) When load capacitance is maximum, first and second RC parallel circuits are applied (b) When load capacitance is reduced, only first RC parallel circuits are applied (d) When load capacitance is reduced, first and second RC parallel circuits are applied

DATA TRANSMISSION SYSTEM AND SEMICONDUCTOR CIRCUIT

CLAIM OF PRIORITY

The present application claims priority from Japanese patent application JP 2010-249998 filed on Nov. 8, 2010, the content of which is hereby incorporated by reference into this application.

BACKGROUND OF THE INVENTION

1. Field of the Invention

The present invention relates to a data transmission system and a semiconductor circuit, and for example, relates to the data transmission system and the semiconductor circuit for transmitting data from an output buffer to an input buffer.

2. Background Art

There is an SSD (solid state drive) as a storage medium which is an alternative to a HDD (Hard disk drive). In recent years, to increase a storage capacity of the SSD, the number of memories trends to increase. When the number of memories increases, load capacitance of an input buffer increases, so that a slew rate of transmission data transmitted by an output buffer is degraded. To suppress the degrading of the slew rate, an internal series resistance value of a driver of the output buffer may be decreased, however, when the internal series resistance value becomes smaller, the ringing is induced because of reflections, and it becomes difficult to secure Signal Integrity.

Patent document 1 describes a circuit which reduces attenuation quantity of frequencies included in rising and falling waves of data, and enables high-bandwidth transmission by inserting a high-pass filter at a transmission terminal of a data transmission system.

Patent document 1: JP Patent Publication (Kokai) No. 2008-294837

However, in Patent document 1, it is an assumption that the load capacitance of the input buffer is a fixed value, so that when the load capacitance of the input buffer is changed, Patent document 1 cannot be applied. Particularly, when the input buffer is a memory LSI, memory capacity is frequently changed, so that when the load capacitance becomes smaller, the large ringing is induced in the wave. When the ringing is induced, a noise margin is reduced, so that the data transmission may become unavailable.

The present invention is implemented under consideration of the above problem, and provides the data transmission system and the semiconductor circuit in which it is possible to perform both of suppressing the degrading of the slew rate (suppressing the attenuation of the frequencies included in the rising and the falling of the data waves), and suppressing the ringing even when the load capacitance of the input buffer is changed.

SUMMARY OF THE INVENTION

To resolve the above problem, the present invention is characterized by that the system is the data transmission system which transmits data from the output buffer to the input buffer through a trace, first RC parallel circuits connected in series to the above trace are provided on a first Printed Circuit Board (PCB) on which the above output buffer is mounted, and second RC parallel circuits connected in series to the above trace are provided on a second Printed Circuit Board (PCB) on which the above input buffer is mounted, and which can be connected and separated to and from the first Printed Circuit Board (PCB).

The present invention is characterized by that the system is the data transmission system which transmits data from the output buffer to the input buffer through the trace, a relay buffer connected in series to the above trace is provided on the first Printed Circuit Board (PCB) on which the above output buffer is mounted, and RC parallel circuits connected in series to the above trace are provided on the second Printed Circuit Board (PCB) on which the above input buffer is mounted, and which can be connected and separated to and from the first Printed Circuit Board (PCB).

According to the present invention, it is possible to perform both of suppressing the degrading of the slew rate, and suppressing the ringing even when the load capacitance of the input buffer is changed. Problems, configurations, and effects other than the above description will become apparent with the description of the following embodiments.

DETAILED DESCRIPTION OF THE PREFERRED EMBODIMENTS

The present invention relates to a data transmission system for transmitting data from an output buffer to an input buffer through a trace. Hereinafter, embodiments of the present invention will be described by referring to the accompanying drawings. However, it is to be noted that the present embodiments are just examples for implementing the present invention, and do not limit the technical scope of the present invention. The same reference numeral is attached to the common component in each drawing.

First Embodiment

In the present embodiment, a data transmission system and a semiconductor circuit will be described in which it is possible to perform both of suppressing the degrading of a slew rate, and suppressing the ringing even when load capacitance of the input buffer is changed.

Figure 1:
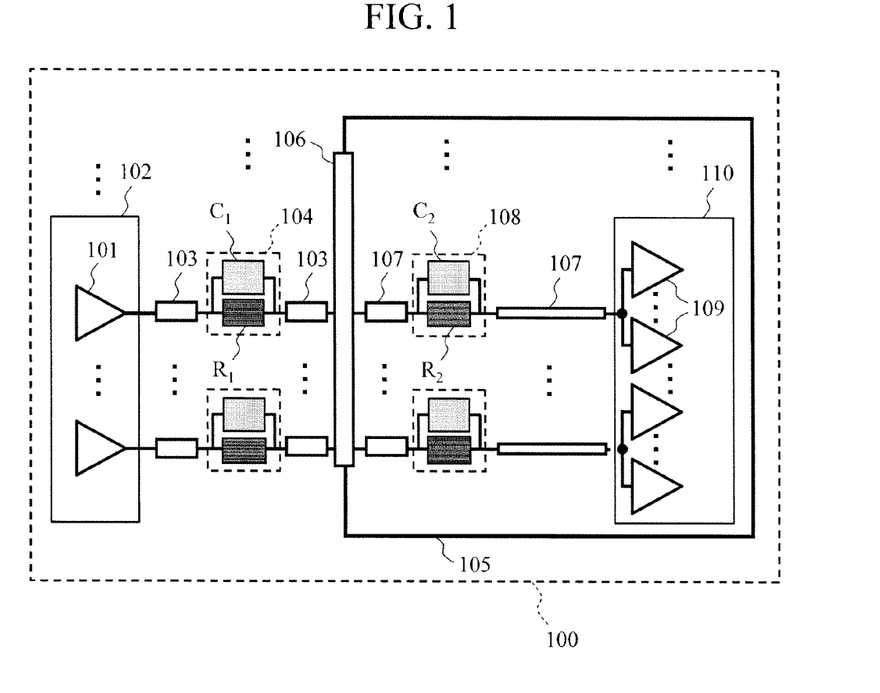
FIG. 1 is a configuration diagram of a data transmission system according to a first embodiment.

FIG. 1 is a configuration diagram of a data transmission system according to a first embodiment. The data transmission system is provided with a first Printed Circuit Board (PCB) 100 and a second Printed Circuit Board (PCB) 105, and both Printed Circuit Boards (PCB) can be connected and separated by a connector 106. The connector 106 is an example of a connection terminal for connecting the Printed Circuit Boards (PCB) so that the Printed Circuit Boards (PCB) can be electrically and mechanically connected and separated. A first semiconductor device 102 including at least one output buffer 101, a first trace 103 for transmitting data from the output buffer 101, first RC parallel circuits 104 including a resistor $R_1$ and a capacitor $C_1$ connected in series to the first trace 103, and the connector 106 for connecting and separating the second Printed Circuit Board (PCB) 105 are provided on the first Printed Circuit Board (PCB) 100. The connector 106 for connecting and separating the first Printed Circuit Board (PCB), a second trace 107 for connecting to the first trace 103, second RC parallel circuits 108 including a resistor $R_2$ and a capacitor $C_2$ connected in series to the second trace 107, and a second semiconductor device 110 including at least one input buffer 109 for one output buffer 101 are provided on the second Printed Circuit Board (PCB) 105. The first RC parallel circuits 104 and the second RC parallel circuits 108 are provided by the number of the output buffers, respectively.

As described above, in the data transmission system in which memory capacity is changed by connecting or separating the second Printed Circuit Board (PCB) with the connector 106, the total length of the traces 103 and 107 is frequently increased, and load capacitance of the input buffer 109 is increased or decreased. Even under such a condition, it is necessary to perform both of suppressing the degrading of the slew rate, and suppressing the ringing for data without depending on the load capacitance of the input buffer 109.

Thus, in the present embodiment, the first RC parallel circuits 104 connected in series to the first trace 103 on the first Printed Circuit Board (PCB) 100, and the second RC parallel circuits 108 connected in series to the second trace 107 on the second Printed Circuit Board (PCB) 105 are provided.

Figure 2:
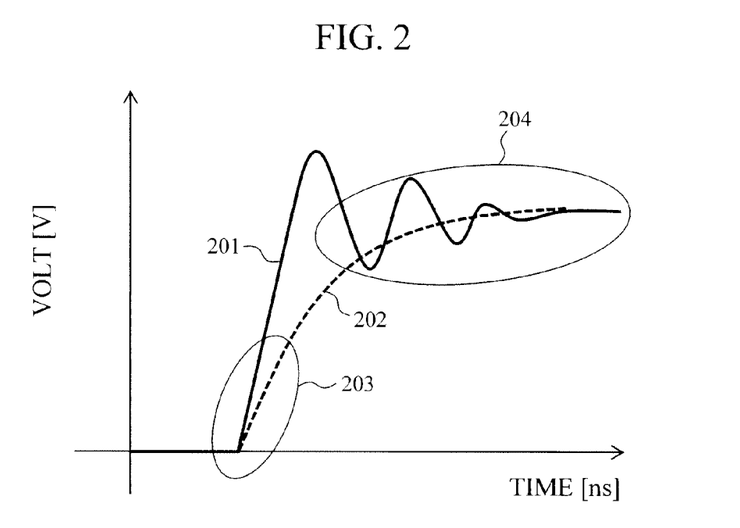
FIG. 2 is a diagram showing a rising wave when transmission data transmitted from an output buffer is monitored at an input buffer.

FIG. 2 is a diagram showing a rising wave when transmission data transmitted from the output buffer is monitored at the input buffer. In FIG. 2, a horizontal axis and a vertical axis show time [ns] and volt [V], respectively, and a wave 201 when the slew rate is large is showed by a solid line, and a wave 202 when the slew rate is small is showed by a dash line. When the two waves are compared, in the case 203 of the rising, the wave 201 is more rapid than the wave 202. However, in the case 204 after the rising, the ringing is induced in the wave 201, on the other hand, the ringing is not induced in the wave 202.

To secure Signal Integrity, it is necessary to perform both of suppressing the degrading of the slew rate, and suppressing the ringing. It is necessary to cause a frequency $f_{knee}$ of data included in the case 203 of the rising so as to secure a timing margin, to suppress the degrading of the slew rate, and it is necessary to attenuate a frequency $f_r$ of data included in the case 204 after the rising so as to reduce a noise margin to suppress the ringing. Hereinafter, methods will be described for realizing of suppressing the degrading of the slew rate, and suppressing the ringing.

(Suppressing the Degrading of the Slew Rate)

If it is assumed that $T_r$ is a risetime, a frequency component of data included in the case 203 of the rising can be expressed by the following formula (Reference literature: Howard Johnson [Design of high speed signal board basic edition] P. 146, [3.20]).

$$f_{knee}=0.35/T_r \qquad \text{(Formula 1)}$$

If it is assumed that $R_{on}$ is an internal series resistance value of the output buffer 101, and $C_{load}$ is a load capacitance value of the input buffer 109, under the consideration that approximately 95% of the wave rises in a time of 3 $R_{on} C_{load}$ in the case 203 of the rising, it is assumed that $T_r$ is expressed by the following formula (Reference literature: Masamitu Kawakami [Revised basic electric circuit III] CORONA PUBLISHING CO. LTD, P. 5).

$$T_r=3R_{on}C_{load} \qquad \text{(Formula 2)}$$

From Formula 1 and Formula 2, $f_{knee}$ is expressed by the following formula.

$$f_{knee}=0.35/3R_{on}C_{load} \qquad \text{(Formula 3)}$$

A Cut off frequency $f_c$ of the RC parallel circuits connected in series to the trace is expressed by the following formula. Here, $R_{hpf}$ is a resistance value of the RC parallel circuits, and $C_{hpf}$ is a capacitance value of the RC parallel circuits.

$$f_c=1/2\pi R_{hpf}C_{hpf} \qquad \text{(Formula 4)}$$

When the RC parallel circuits for causing $f_{knee}$ to pass through is designed, it is possible suppress to the degrading of the slew rate. Thus, the Cut off frequency $f_c$ is caused to be smaller than the frequency $f_{knee}$ of data included in the case 203 of the rising.

$$f_c<f_{knee} \qquad \text{(Formula 5)}$$

(Suppressing the Ringing)

The frequency $f_r$ of the ringing because of reflections cannot be simply obtained in this data transmission system. Thus, a method for causing the Cut off frequency $f_c$ to be higher than the frequency of the ringing is not used. The ringing induced in the transmission data is induced because of the reflections, so that a method for setting a resistance value of the RC parallel circuits so as to damp reflection waves is used. The ringing is a vibration in a static state in which $C_1$ and $C_2$ are charged, so that the reflection waves pass through $R_1$ and $R_2$ to return to a transmission terminal. That is, the waves are damped because of the existence of $R_1$ and $R_2$.

The reflections are induced at a connection point of devices or traces whose impedances are different, however, it is assumed here that the reflections induced at a point other than the connection point (an input terminal) of the traces and the input buffer are ignored. Because, only the load capacitance is connected after the input terminal, so that the input terminal is not terminated, and data is totally reflected at the input terminal. That is, because the reflection waves at other connection point are smaller compared with the reflection waves at the input terminal.

First, $R_1$ of the first RC parallel circuits 104 will be determined. Because the trace does not ideally include a component for attenuating the data, a Characteristic Impedance $Z_0$ of the trace will be ignored, and only the total value of $R_{on}$ and $R_1$ which can damp the data will be considered. When the total value of $R_{on}$ and $R_1$ is larger than $Z_0$, a phase is changed, so that the reflection waves become larger, however, when the total value of $R_{on}$ and $R_1$ is equal to or larger than $Z_0/2$, re-reflections at the connection point (an output terminal) of the output buffer 101 and the first trace 103 can be suppressed to ⅓ or less. When the re-reflections at the output terminal are large, a noise is affected to the next data (Intersymbol interference: ISI), and a noise margin may be reduced.

Thus, the resistance value $R_1$ of the first RC parallel circuits 104 is determined so as to satisfy the following formula.

$$Z_0 \geq R_{on} + R_1 \geq Z_0/2 \qquad \text{(Formula 6)}$$

Next, $R_2$ of the second RC parallel circuits 108 will be determined. As described above, $Z_0$ will be ignored, and only the total value of $R_{on}$, $R_1$, and $R_2$ which can damp the data will be considered. When a value of $C_{load}$ of the input buffer is changed, and when it is necessary to further suppress the ringing than only the first RC parallel circuits 104, this second RC parallel circuits 108 becomes effective. In Formula 6, when the value of $C_{load}$ becomes smaller, the ringing becomes larger. The reasons are as follows. (1) the waves of the case 203 of the rising of the transmission data become rapid, and (2) the attenuation of the reflection waves because of $R_1$ is small. Thus, by setting $R_2$ of the second RC parallel circuits, the damping of the reflection waves is caused to be larger. Meanwhile, when the value of $C_{load}$ is not changed, by inserting the second RC parallel circuits 108, the suppressing of the ringing becomes more effective.

Thus, the resistance value $R_2$ of the second RC parallel circuits 108 is determined so as to satisfy the following formula.

$$Z_0 \geq R_{on} + R_1 + R_2 \geq Z_0/2 \qquad \text{(Formula 7)}$$

(Design of RC Parallel Circuits)

It is assumed that the load capacitance $C_{load}$ of the input buffer 109 is $C_{load\_max}$ when being maximum, and the first RC parallel circuits 104 are designed so as to satisfy the following formula obtained from Formulas 2 to 4 and Formula 6. Meanwhile, it is assumed that $R_{hpf}$ and $C_{hpf}$ of Formula 4 are $R_1$ and $C_1$, respectively.

$$C_1 > 3R_{on} * C_{load\_max}/(0.35 * 2\pi * R_1) \qquad \text{(Formula 8)}$$

$$Z_0 - R_{on} \geq R_1 \geq Z_0/2 - R_{on} \qquad \text{(Formula 9)}$$

The second RC parallel circuits 108 are designed so as to satisfy the following formula obtained from Formulas 2 to 4 and Formula 7.

$$C_2 > 3R_{on} * C_{load}/(0.35 * 2\pi * R_2) \qquad \text{(Formula 10)}$$

$$Z_0 - R_{on} - R_1 \geq R_2 \geq Z_0/2 - R_{on} - R_1 \qquad \text{(Formula 11)}$$

Meanwhile, it is described above that the reflections other than at the input terminal will be ignored, however, by inserting the first RC parallel circuits 104 to the nearest point of the output buffer 101, the re-reflections can be suppressed at the output terminal (referred to as source matching). The second RC parallel circuits 108 may be located anywhere on the second Printed Circuit Board (PCB) 105.

Figure 3:
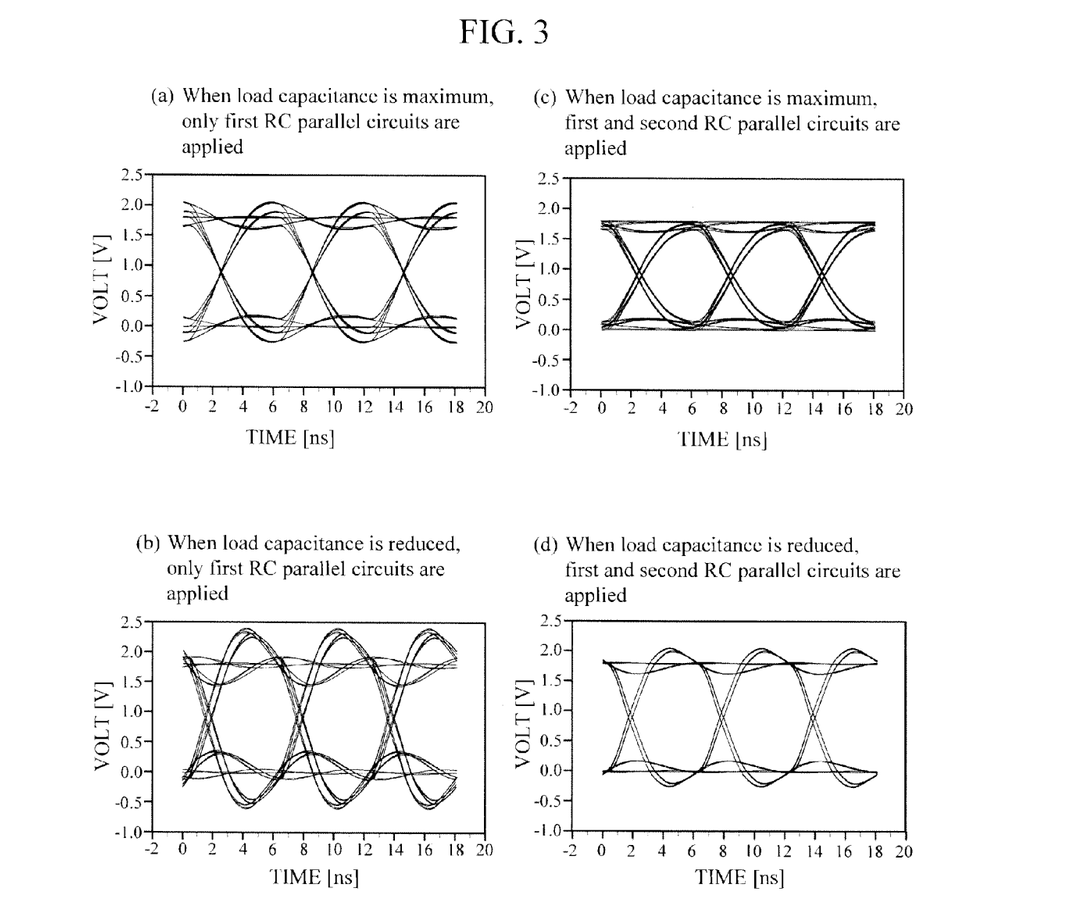
FIG. 3 is a diagram showing data waves obtained in the data transmission system.

FIG. 3 is a diagram showing data waves obtained in the data transmission system. Here, from that the Characteristic Impedance $Z_0$ of the trace=40Ω, the internal series resistance value $R_{on}$ of the output buffer 101=5Ω, the load capacitance $C_{load}$ of the input buffer 109=80 pF, and $C_{load\_max}$=160 pF, it is determined that $R_1$ of the first RC parallel circuits 104=15Ω, $C_1$=270 pF, $R_2$ of the second RC parallel circuits 108=5Ω, and $C_2$=270 pF. Meanwhile, a transmission rate is 166 Mbps, and a trace length is 110 mm.

FIG. 3 (a) is an eye pattern when the load capacitance is maximum ($C_{load\_max}$=160 pF), and when only the first RC parallel circuits are applied, (b) is the eye pattern when only the first RC parallel circuits are applied, and when the load capacitance is smaller ($C_{load}$=80 pF), (c) is the eye pattern when the load capacitance is maximum ($C_{load\_max}$=160 pF), and when the first and second RC parallel circuits of the present invention are applied, and (d) is the eye pattern when the first and second RC parallel circuits of the present invention are applied, and when the load capacitance is smaller ($C_{load}$=80 pF). When referring to FIGS. 3 (a) and (b), and when only the first RC parallel circuits are applied, and when the load capacitance becomes from maximum to smaller, the degrading of the slew rate can be suppressed, however the ringing is increased. On the other hand, when referring to FIGS. 3 (c) and (d), it is apparent that, when the first and second RC parallel circuits are applied, and when the load capacitance becomes from maximum to smaller, the degrading of the slew rate can be suppressed, and the ringing can be also suppressed.

As described above, the data transmission system according to the present embodiment is characterized by including the first RC parallel circuits 104 connected in series to the first trace 103 for connecting the output buffer 101 and the connector 106, and the second RC parallel circuits 108 connected in series to the second trace 107 for connecting the connector 106 and the input buffer 109.

In such a configuration, even when the load capacitance of the input buffer is changed, it is possible to perform both of suppressing the degrading of the slew rate, and suppressing the ringing.

The following embodiments are configured so that devices to be used are characteristic in the data transmission system described in the present embodiment.

Second Embodiment

In the second embodiment of the present invention, the data transmission system will be described in which a footprint of the RC parallel circuits can be caused to be smaller.

Figure 4:
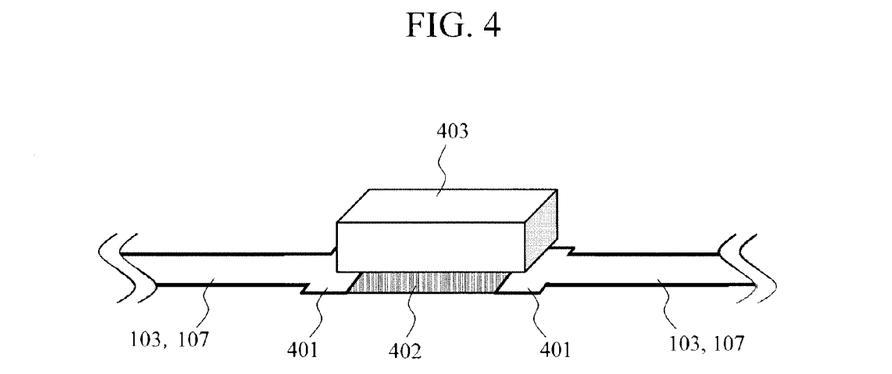
FIG. 4 is a diagram illustrating a sheet resistor as a resistor, and a chip capacitor as a capacitor which are mounted in RC parallel circuits of the first embodiment.

FIG. 4 is a diagram illustrating a sheet resistor as a resistor, and a chip capacitor device as a capacitor which are mounted in the RC parallel circuits of the first embodiment. This RC parallel circuits include a sheet resistor 402 connected in series to the trace 103 or 107 provided with a pad 401 at an end, and a chip capacitor 403 connected in series to the trace 103 or 107 on the sheet resistor 402. This configuration is applied to at least one of the first RC parallel circuits 104 and the second RC parallel circuits 108.

In such a configuration, it becomes possible to realize the effect of the first embodiment, and also cause the footprint to be smaller.

Third Embodiment

In the third embodiment of the present invention, the data transmission system will be described in which the footprint of the RC parallel circuits can be caused to be smaller.

Figure 5:
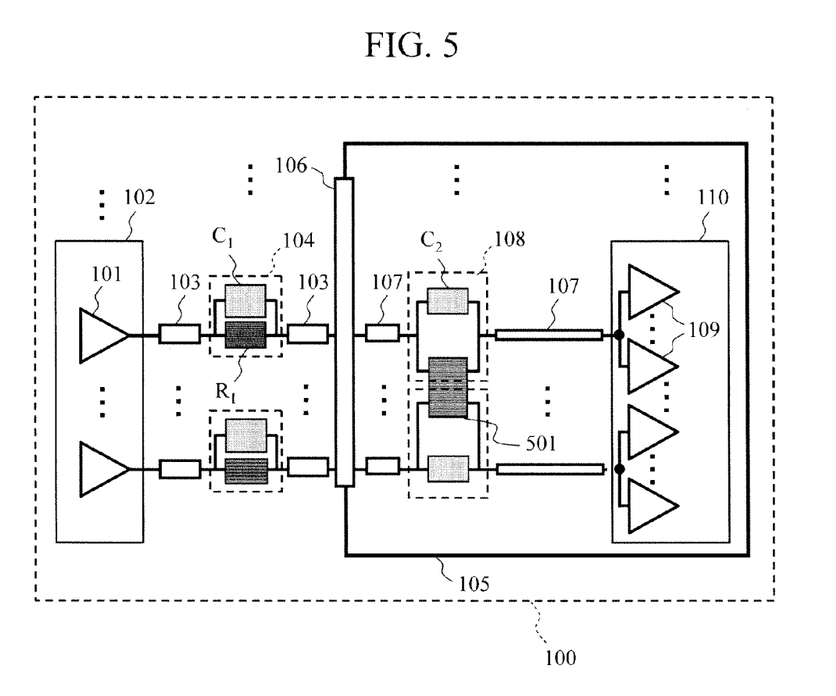
FIG. 5 is a configuration diagram of the data transmission system in which an array resistor is mounted as the resistor of the RC parallel circuits of the first embodiment.

FIG. 5 is a configuration diagram of the data transmission system in which an array resistor device is mounted as a resistor of the RC parallel circuits of the first embodiment. In FIG. 5, an array resistor 501 is applied to the resistor $R_2$ of the second RC parallel circuits 108, however, the array resistor 501 can be applied to at least one of the first RC parallel circuits 104 and the second RC parallel circuits 108.

In such a configuration, it becomes possible to realize the effect of the first embodiment, and also cause the footprint to be smaller.

Fourth Embodiment

In the fourth embodiment of the present invention, the data transmission system will be described in which the number of the input buffers 109 to be connected for one output buffer 101 can be increased.

Figure 6:
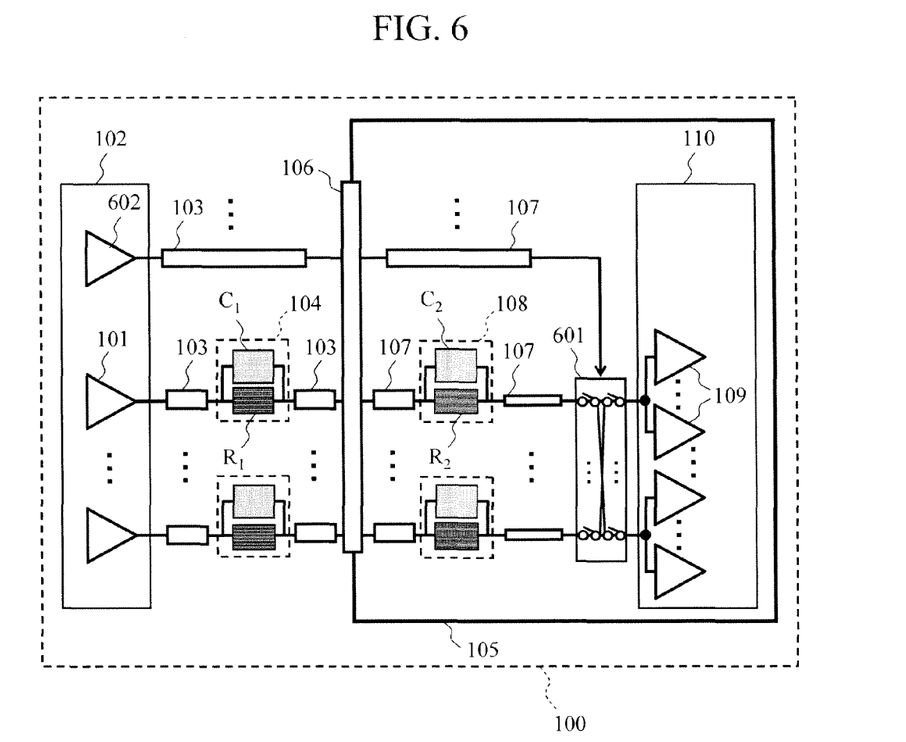
FIG. 6 is a configuration diagram of the data transmission system in which a Bus switch is mounted in a second trace of the first embodiment.

FIG. 6 is a configuration diagram of the data transmission system in which a Bus switch 601 is mounted in the second trace 107 of the first embodiment. In the data transmission system according to the present embodiment, the Bus switch 601 inserted between the output buffer 101 and the input buffer 109, and an output buffer 602 for transmitting data controlling the Bus switch 601 are added.

The number of the input buffers 109 which can be connected to the output buffer 101 depends on a charging time determined by a product of the internal series resistance $R_{on}$ of the output buffer 101 and the load capacitance $C_{load}$ of the input buffer 109. When the number of the input buffers 109 is increased, a time for charging the load capacitance $C_{load}$ becomes longer, and the slew rate is degraded. When the slew rate is degraded, the timing margin is lost, and the data transmission may be impossible.

Thus, by switching the number of the input buffers 109 by the Bus switch 601, the minimum number of the load capacitances $C_{load}$ are charged in the case 203 of the rising, and the remaining load capacitances are charged as necessary in the case 204 after the rising. Thus, the degrading of the slew rate is suppressed in the case 203 of the rising, and also, the number of the input buffers 109 can be increased by the number which can be switched by the Bus switch 601. That is, the number of fan-outs of the input buffer 109 which can be connected to the output buffer 101 can be increased. Particularly, when the second semiconductor device 110 is a memory LSI, the increasing of the memory capacity can be accepted.

Fifth Embodiment

In the fifth embodiment of the present invention, the data transmission system will be described in which the footprint of the RC parallel circuits can be caused to be smaller.

Figure 7:
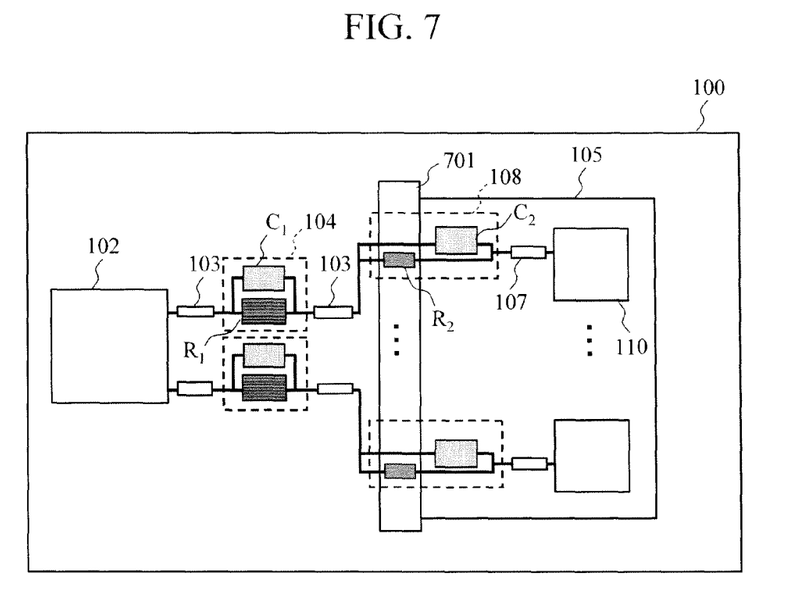
FIG. 7 is a configuration diagram of the data transmission system in which a socket which is an alternative to a connector for connecting a second Printed Circuit Board (PCB) to a first Printed Circuit Board (PCB) is mounted, and a resistor $R_2$ of second RC parallel circuits is mounted in the socket in the first embodiment.

FIG. 7 is a configuration diagram of the data transmission system in which a socket 701 which is an alternative to the connector 106 for connecting the second Printed Circuit Board (PCB) 105 to the first Printed Circuit Board (PCB) 100 is mounted, and the resistor $R_2$ of the second RC parallel circuits 108 is mounted in the socket 701 in the first embodiment. The capacitor $C_2$ of the second RC parallel circuits 108 is mounted as an external part on the second Printed Circuit Board (PCB) 105. The second Printed Circuit Board (PCB) 105 is, for example, a DIMM (Dual Inline Memory Module), and the socket 701 is, for example, a DIMM socket.

In such a configuration, it becomes possible to save the footprint of the resistor $R_2$, realize the effect of the first embodiment, and also cause the footprint to be smaller.

Sixth Embodiment

In the sixth embodiment of the present invention, the data transmission system will be described in which the footprint of the RC parallel circuits can be caused to be smaller.

Figure 8:
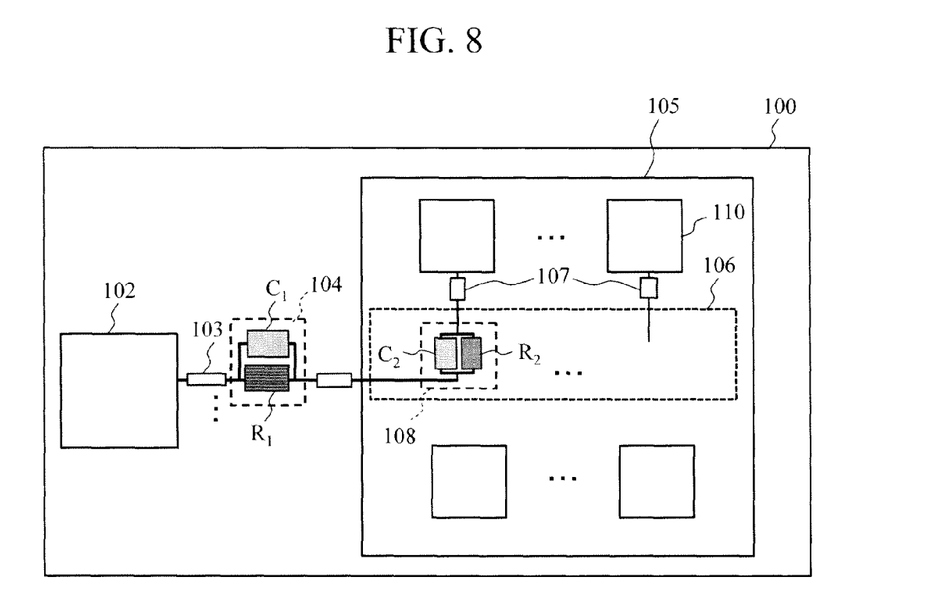
FIG. 8 is a configuration diagram of the data transmission system in which the second RC parallel circuits are mounted in the opposite side of the second Printed Circuit Board (PCB) in which the connector is mounted in the first embodiment.

FIG. 8 is a configuration diagram of the data transmission system in which the second RC parallel circuits 108 are mounted in the opposite side of the second Printed Circuit Board (PCB) 105 in which the connector 106 is mounted in the first embodiment. When a mezzanine connector is, for example, used as the connector 106 for connecting and separating the first Printed Circuit Board (PCB) 100 and the second Printed Circuit Board (PCB) 105 as illustrated in FIG. 8, the footprint in which the connector 106 is mounted becomes larger. A plurality of holes to which pins of the connector 106 are inserted are included in the opposite side of the second Printed Circuit Board (PCB) 105 in which the connector is mounted, so that the opposite side is not normally used.

Thus, in the present embodiment, by mounting the second RC parallel circuits 108 in a space between the holes, the second Printed Circuit Board (PCB) 105 is effectively used.

In such a configuration, it becomes possible to realize the effect of the first embodiment, and also cause the footprint to be smaller.

Here, such an example is described that the second RC parallel circuits 108 are mounted, however, the Bus switch 601 may be, for example, mounted.

In this case, it becomes possible to realize the effect of the first embodiment and the fourth embodiment, and also cause the footprint to be smaller.

Seventh Embodiment

In the seventh embodiment of the present invention, the data transmission system will be described in which it is possible to perform both of suppressing the degrading of the slew rate, and suppressing the ringing, and also, to accept the change of the load capacitance in the data transmission system without using the first RC parallel circuits.

Figure 9:
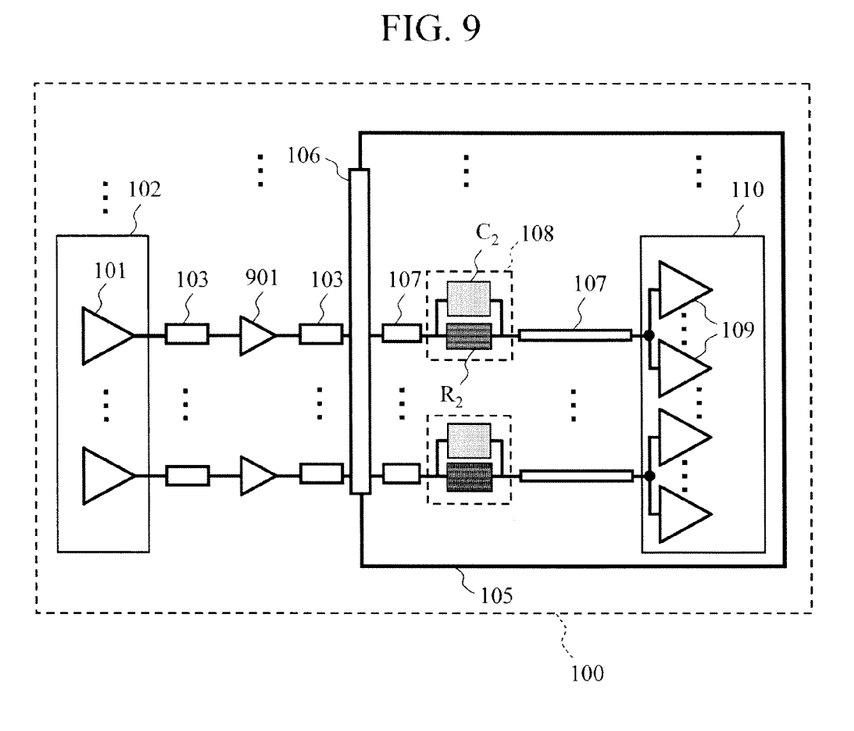
FIG. 9 is a configuration diagram of the data transmission system in which a relay buffer is inserted in series to a first trace as an alternative of first RC parallel circuits in the first embodiment.

FIG. 9 is a configuration diagram of the data transmission system in which a relay buffer 901 is inserted in series to the first trace 103 as an alternative of the first RC parallel circuits 104 in the first embodiment.

As the trace length of the trace which becomes a transmission path of data becomes longer, trace resistance becomes larger. When the trace resistance becomes unable to be ignored, a frequency component included in the case 203 of the rising of data is attenuated, and the slew rate is degraded.

Thus, in the present embodiment, by inserting the relay buffer 901 in series to the first trace 103, the degrading of the slew rate because of the trace resistance is suppressed.

In the case of the present embodiment, $R_2$ and $C_2$ of the second RC parallel circuits are designed so as to satisfy the following formula. Here, $R_{buffer\_on}$ is the internal series resistance value of the relay buffer 901.

$$C_2 > 3 R_{buffer\_on} * C_{load}/(0.35*2\pi*R_2) \quad \text{(Formula 12)}$$

$$Z_0 - R_{buffer\_on} \geq R_2 \geq Z_0/2 - R_{buffer\_on} \quad \text{(Formula 13)}$$

In such a configuration, even when the trace length is long, it becomes possible to realize the effect of the first embodiment.

Meanwhile, the present invention is not limited to the above-described embodiments, and includes a variety of modified examples. For example, the above-described embodiments are particularly described to obviously describe the present invention, and the present invention is not necessarily limited to the embodiments provided with all the described components. A part of the configuration of one embodiment can be replaced to the configuration of another embodiment, and the configuration of another embodiment can be also added to the configuration of one embodiment. A part of the configuration of each embodiment can be added, deleted, or replaced by another configuration.

By using the multistage configuration for a part or all of the above-described each configuration, the performance may be improved. For example, the multistage configuration for the RC parallel circuits, or the multistage configuration for the relay buffer may be used.

The trace of data and the device of each configuration which are considered to be necessary to describe are indicated, and all of the traces and the devices of each configuration are not necessarily indicated for the products. It may be considered that the number of types of line topology for connecting each configuration and the number of the devices of each configuration may actually become a plural number.

DESCRIPTION OF SYMBOLS

- 100 First Printed Circuit Board (PCB)
- 101 Output buffer
- 102 First semiconductor device
- $R_1$ Resistor
- $C_1$ Capacitor
- 103 First trace
- 104 First RC parallel circuits
- 105 Second Printed Circuit Board (PCB)
- 106 Connector
- $R_2$ Resistor
- $C_2$ Capacitor
- 107 Second trace
- 108 Second RC parallel circuits
- 109 Input buffer
- 110 Second semiconductor device

What is claimed is:

1. A data transmission system transmitting data from an output buffer to an input buffer through a trace, comprising:
   first RC parallel circuits connected in series to the trace on a first Printed Circuit Board (PCB) on which the output buffer is mounted; and
   second RC parallel circuits connected in series to the trace on a second Printed Circuit Board (PCB) on which the input buffer is mounted, and which can be connected and separated to and from the first Printed Circuit Board (PCB), wherein
   a Characteristic Impedance of the trace is $Z_0$, an internal series resistance value of the output buffer is $R_{on}$, load capacitance of the input buffer is $C_{load}$, and a maximum value of $C_{load}$ is $C_{load\_max}$;
   a capacitance $C_1$ and a resistance $R_1$ included in the first RC parallel circuits satisfy the following formulas:

$$C_1 > 3R_{on} * C_{load\_max}/(0.35 * 2\pi * R_1)$$

$$Z_0 - R_{on} \geq R_1 \geq Z_0/2 - R_{on}$$

a capacitance $C_2$ and a resistance $R_2$ included in the second RC parallel circuits satisfy the following formulas:

$$C_2 > 3R_{on} * C_{load}/C(0.35 * 2\pi * R_2)$$

$$Z_0 - R_{on} - R_1 \geq R_2 \geq Z_0/2 - R_{on} - R_1.$$

2. The data transmission system according to claim 1, wherein
   at least one of the resistances $R_1$ and $R_2$ included in the first and second RC parallel circuits respectively is formed by a sheet resistance device, at least one of the capacitances $C_1$ and $C_2$ included in the first and second RC parallel circuits respectively is formed by a chip capacitor device, and the chip capacitor device is mounted on the sheet resistance device.

3. The data transmission system according to claim 1, wherein
   at least one of the resistances $R_1$ and $R_2$ included in the first and second RC parallel circuits respectively is formed by an array resistance device.

4. The data transmission system according to claim 1, wherein
   further, a Bus switch for switching the number of the input buffers is inserted between the output buffer and the input buffer.

5. The data transmission system according to claim 1, wherein
   the first Printed Circuit Board (PCB) and the second Printed Circuit Board (PCB) is connected and separated by a connector which is provided on each Printed Circuit Board (PCB), and the second RC parallel circuits are mounted in an opposite side of the second Printed Circuit Board (PCB) in which the connector is mounted.

6. A data transmission system transmitting data from an output buffer to an input buffer through a trace, comprising:
   a relay buffer connected in series to the trace on a first Printed Circuit Board (PCB) on which the output buffer is mounted; and
   RC parallel circuits connected in series to the trace on a second Printed Circuit Board (PCB) on which the input buffer is mounted, and which can be connected and separated to and from the first Printed Circuit Board (PCB), wherein
   a Characteristic Impedance of the trace is $Z_0$, an internal series resistance value of the relay buffer is $R_{buffer\_on}$, and load capacitance of the input buffer is $C_{load}$;
   a capacitance $C$ and a resistance $R$ included in the RC parallel circuits satisfy the following formulas:

$$C > 3R_{buffer\_on} * C_{load}/(0.35 * 2\pi * R)$$

$$Z_0 - R_{buffer\_on} \geq R \geq Z_0/2 - R_{buffer\_on}.$$

* * * * *